United States Patent [19]

Takagi

[11] Patent Number: 5,266,985
[45] Date of Patent: Nov. 30, 1993

[54] CAMERA WITH OPTIMUM COMPOSITION DETERMINATOR

[75] Inventor: Tadao Takagi, Yokohama, Japan

[73] Assignee: Nikon Corporation, Tokyo, Japan

[21] Appl. No.: 967,535

[22] Filed: Oct. 28, 1992

Related U.S. Application Data

[63] Continuation of Ser. No. 726,828, Jul. 8, 1991, abandoned.

[30] Foreign Application Priority Data

Jul. 16, 1990 [JP] Japan .................. 2-187764

[51] Int. Cl.$^5$ .............................. G03B 7/00
[52] U.S. Cl. .................. 354/410; 354/412; 354/432
[58] Field of Search ........... 354/410, 412, 432, 400, 354/402

[56] References Cited

U.S. PATENT DOCUMENTS

| | | | |
|---|---|---|---|
| 4,978,990 | 12/1990 | Yamasaki et al. | 354/432 |
| 5,003,338 | 3/1991 | Takagi et al. | 354/402 |
| 5,128,711 | 7/1992 | Terashita et al. | 354/410 |

FOREIGN PATENT DOCUMENTS 62-118328  5/1987  Japan .
62-251729  11/1987  Japan .

*Primary Examiner*—Russell E. Adams
*Attorney, Agent, or Firm*—Shapiro and Shapiro

[57] ABSTRACT

A camera comprises a detector for detecting the position of an object in the photographing plane to output the result thereof as position information, and a determinator for determining the optimum composition on the basis of the position information and a predetermined compositional information.

16 Claims, 5 Drawing Sheets

| FIG. 4A |
|---------|
| FIG. 4B |

CAMERA WITH OPTIMUM COMPOSITION DETERMINATOR

This is a continuation of application Ser. No. 726,828 filed Jul. 8, 1991, now abandoned.

BACKGROUND OF THE INVENTION

1. Field of the Invention

The present invention relates to a camera capable of obtaining the direction of a composition which should be modified and indicating the direction thereof.

2. Related Background Art

Traditionally, there has been known a camera capable of automatically changing the focal distance of a zooming lens on the basis of the photographing distance information (Japanese Patent Laid-Open Application No. 62-118328) or a camera capable of automatically changing the focal distance of a photographing lens on the basis of the photographing distance and the defined photographing magnification (Japanese Patent Laid-Open Application No. 62-251729). However, as to the composition at the time of taking a picture, the camera has not participated in it heretofore, but the composition is decided only by the photographer himself.

Nevertheless, the photographers who can decide on a good composition are extremely limited at present, and the fact is that there are still many photographers who consider that a person, for example, should always be positioned in the center of a picture to be taken. As a result, there exists a problem that even if a high-quality camera is used, an excellent photograph cannot be obtained due to a defective composition.

SUMMARY OF THE INVENTION

An object of the present invention is to provide a camera whereby anyone can easily take a picture of an excellent composition.

In attempting to describe the present invention in conjunction with FIG. 1 showing an embodiment, the camera of the present invention, which is capable of indicating the direction of a composition, is provided with an object position recognition means 2 for recognizing the position of an object in the photographing plane to output the result thereof, a computation means 1 for calculating the direction of the composition which should be shifted on the basis of the output from the object position recognition means 2 and a predetermined basic composition information, and indication means 5, 21a–21c, 22a–22c (FIG. 3) for indicating the shift of the composition to the direction which has been calculated; thus solving the above-mentioned problem.

The computation means 1 calculates the shifting direction of the composition in accordance with the output from the object position recognition means 2 and a predetermined basic composition information, and the indication means 5, 21a–21c and 22a–22c indicate that the composition should be shifted to the direction thus calculated. As a result, anyone of photographers can take a picture of an excellent composition by shifting the direction of the composition as indicated.

In this respect, while the description of the present invention set forth above has been made in conjunction with FIG. 1 showing an embodiment thereof in order to make the present invention readily understandable, it is to be understood that the present invention is not limited to such embodiment.

BRIEF DESCRIPTION OF THE DRAWINGS

FIG. 1 through FIG. 5 show an embodiment according to the present invention;

FIG. 1 is a block diagram showing the entire structure of a camera according to the present invention;

FIG. 2 is a view illustrating the object recognition method;

FIGS. 4, 4A, 4B and FIG. 5, are flowcharts showing the process procedures.

DETAILED DESCRIPTION OF THE PREFERRED EMBODIMENTS

Hereinafter, in conjunction with FIG. 1 through FIG. 5, an embodiment according to the present invention will be described.

Figure 1:
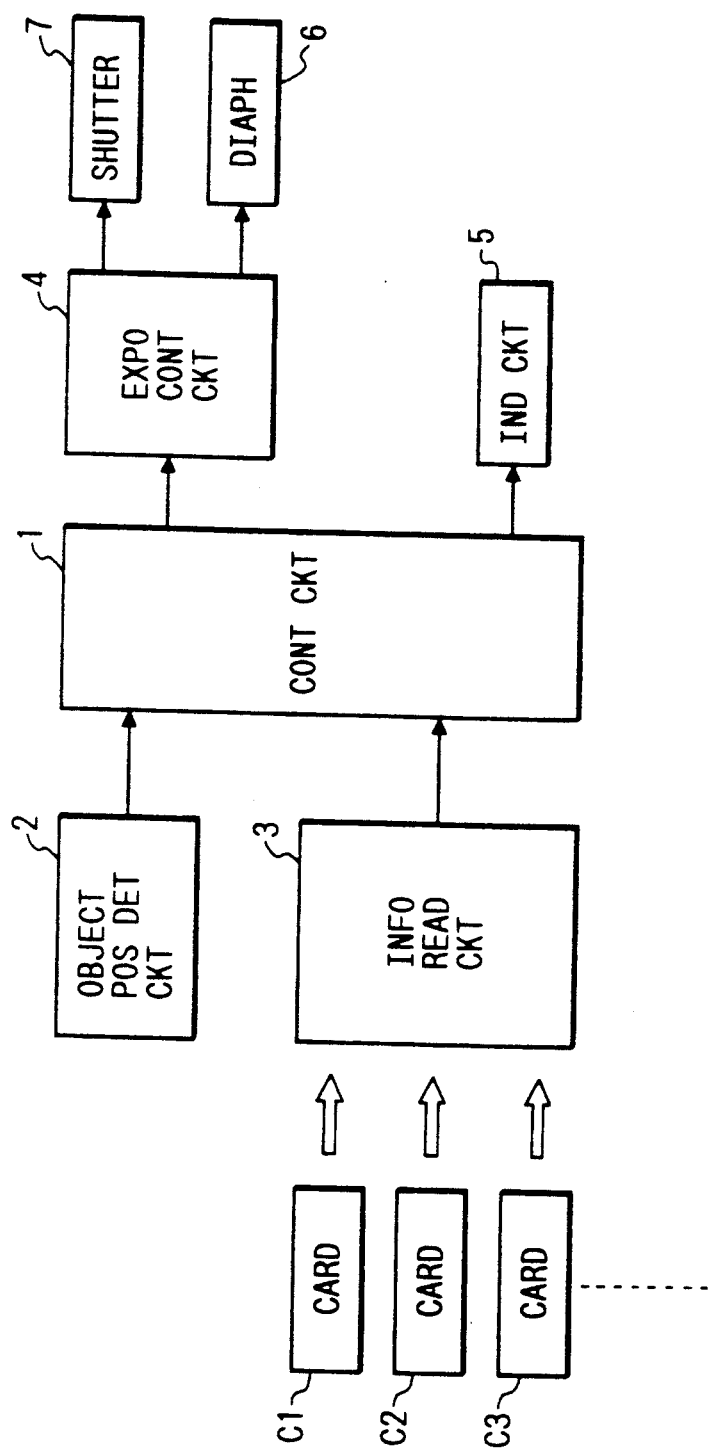
Figure 2:
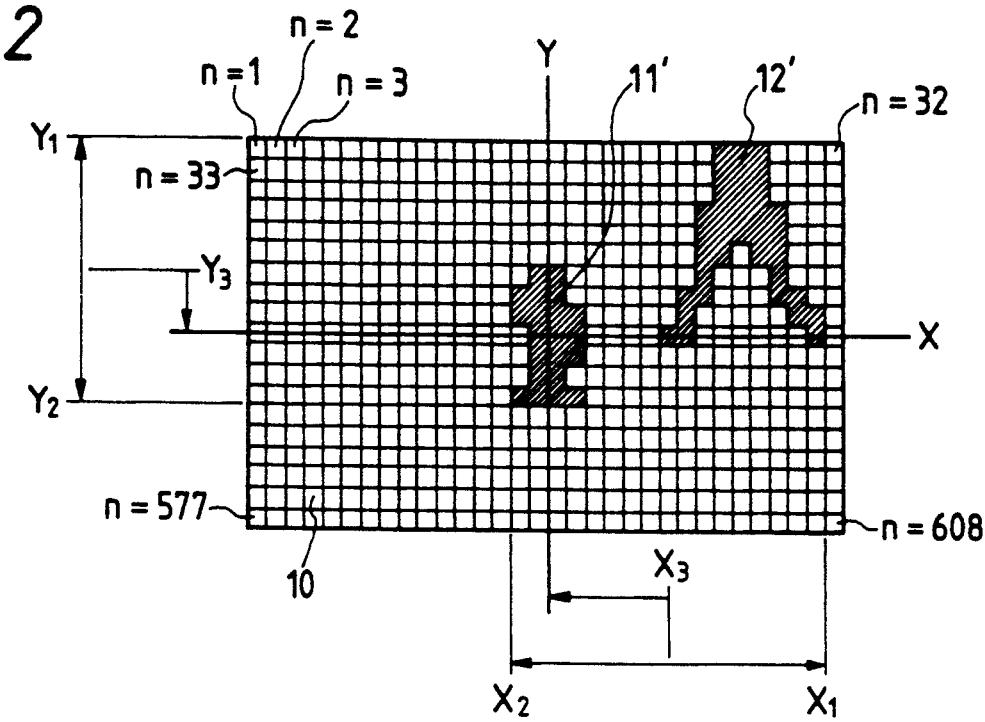

FIG. 1 is a block diagram showing the entire structure of the camera of the present invention. To a control circuit 1, an object position recognition circuit 2 is connected. This object position recognition circuit 2 divides the photographing plane 10 into 608 square regions (19 (vertical)×32 (horizontal)) as shown in FIG. 2, for example, and performs focusing detections for the respective objects positioned in each of the divided regions by the known TTL phase difference detection method to output each amount of image deviation.

Here, since this amount of image deviation depends on the distance to each of the images, this is hereinafter referred to as object distance information D(n) (where n=1–608). This n value indicates each of the regions mentioned above respectively, and the region at the extreme left side of the uppermost row is defined as 1; then, defined as 2, 3, . . . , and 32 to the right. Subsequently, from the extreme left side at the second row, each region is defined as 33, 34, . . . , then, from the extreme left side at bottom row (19th), the region is defined as 577, and the extreme right side, 608. Thus, each of the above-mentioned object distance informations D(1)–D(608) are inputted into the control circuit 1.

Also, to the control circuit 1, an information read circuit 3, exposure control circuit 4, and display circuit 5 are connected. In the camera of the present invention, it is possible to load cards C1, C2, C3, and . . . , on which information is respectively recorded regarding the composition (hereinafter referred to as basic composition information which will be described later in detail) used by a well-known cameraman, for example, and the information read circuit 3 reads the above-mentioned basic composition information recorded on the load card to input such information into the control circuit 1. The control circuit 1 stores the information thus read.

Figure 3A:
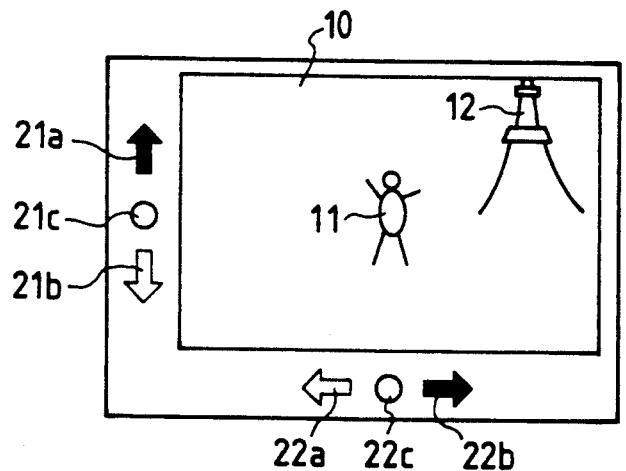
FIGS. 3A and 3B are views showing a photographing image and a display example of the modified composition in the finder, respectively.
Figure 3B:
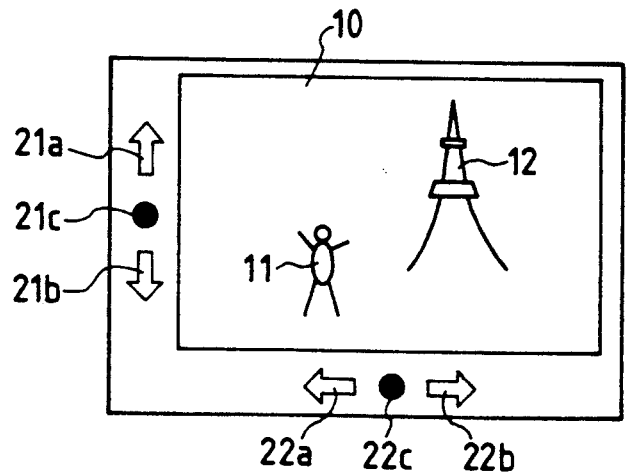

The exposure control circuit 4 drives the diaphragm 6 and shutter 7 in response to the instructions from the control circuit 1 to take a picture. Also, to the display circuit 5, the display LEDs 21a–21c and 22a–22c in the finder shown in FIGS. 3A and 3B are connected, and the LEDs 21a–21c and 22a–22c are turned on or turned off in response to the display signals from the control circuit 1. Now, the LEDs 21a–21c and 22a–22c will be described in detail.

As shown in FIGS. 3A and 3B, the LEDs 21a–21c are located on the left side of the photographing plane 10, and the LEDs 22a–22c are located at the lower side of the photographing plane 10, respectively. Among these, the LED 21a functions to indicate that the photographing plane 10 should be shifted upward; LED 21b indicates that the photographing plane 10 should be shifted downward; and LED 21c indicates that the photographing plane 10 should be held at the current position as it is. Likewise, the LED 22a indicates that the photographing plane 10 should be shifted left side; LED 22b indicates that the photographing plane 10 should be shifted to the right side; and the LED 22c indicates that the photographing plane 10 should be held at the current position as it is.

Subsequently, in conjunction with FIG. 2, the description will be made of the basic composition information mentioned above.

Now, assuming that a photographing plane 10 such as shown in FIG. 3A is obtained when a photographer holds a camera to define a composition. In the photographing plane 10, a reference numeral 11 designates a person, and 12, a tower as a background object. At this juncture, the control circuit 1 recognizes the above-mentioned objects 11 and 12 positioned in the photographing plane 10 and extracts them, as will be described later in detail, in accordance with the object distance signals D(n) output by the above-mentioned object position recognition circuit 2. In other words, the region 11' and region 12' shown by slanting lines in FIG. 2 are the respective results of the extracted person 11 and tower 12. Also, the X axis and Y axis of FIG. 2 extends respectively in the horizontal and vertical directions through the center of the photographing plane, and the intersecting point thereof is assumed to be the coordinate (0, 0). Here, the coordinate value in FIG. 2 is the value obtained by making the longitudinal and transversal widths of one divided region to be 1 respectively. Further, in FIG. 2, a reference mark X1 designates the X coordinate at the extreme right side of the extracted region (here the region regions 11' and 12'); X2, the X coordinate at the extreme left side thereof; likewise, Y1, the Y coordinate at the uppermost end of the extracted region; and Y2, the Y coordinate at the lowest end thereof. As clearly seen from this, each of the coordinate values X1, X2, Y1, and Y2 are different by the conditions of the composition (the positions of objects in the photographing plane 10).

Also, reference marks X3, and Y3 in FIG. 2 are the X and Y coordinate values obtainable by assigning the above-mentioned X1, X2, Y1, and Y2 to a predetermined operation expression. Such operation expression is recorded in advance on each of the cards C1, . . . , shown in FIG. 1. The mode of such operation expression is different by each card. Further, in the cards C1, . . . , ΔX and ΔY are recorded in addition to the above-mentioned operation expression. These are the coordinates which should be shifted to the calculated coordinates (X3 and Y3). In other words, if ΔX=ΔY=0, for example, it expresses that the intersecting point (0, 0) of the X and Y axes should be shifted to the coordinates (X3 and Y3), and the operation expression to obtain the above-mentioned X3 and Y3, and these ΔX and ΔY correspond to the basic composition information in the present embodiment.

Now, in accordance with the flowcharts shown in FIG. 4 and FIG. 5, the controlling sequence by the control circuit 1 will be described.

Figures 4, 4A:
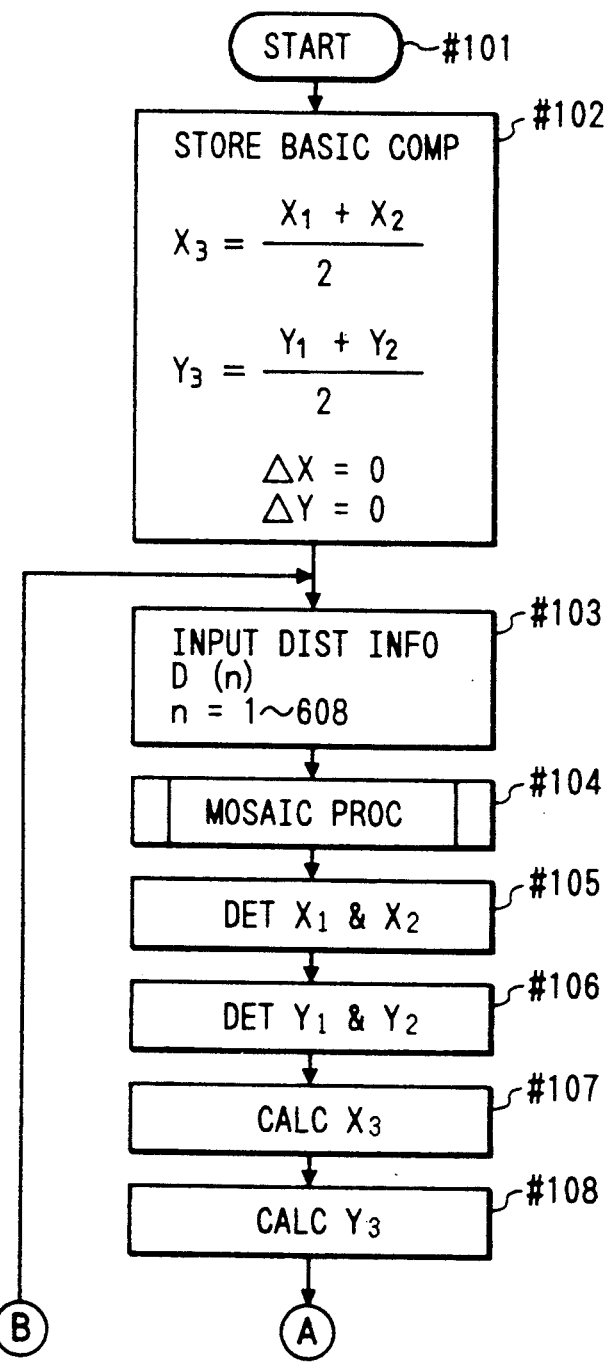
Figure 4B:
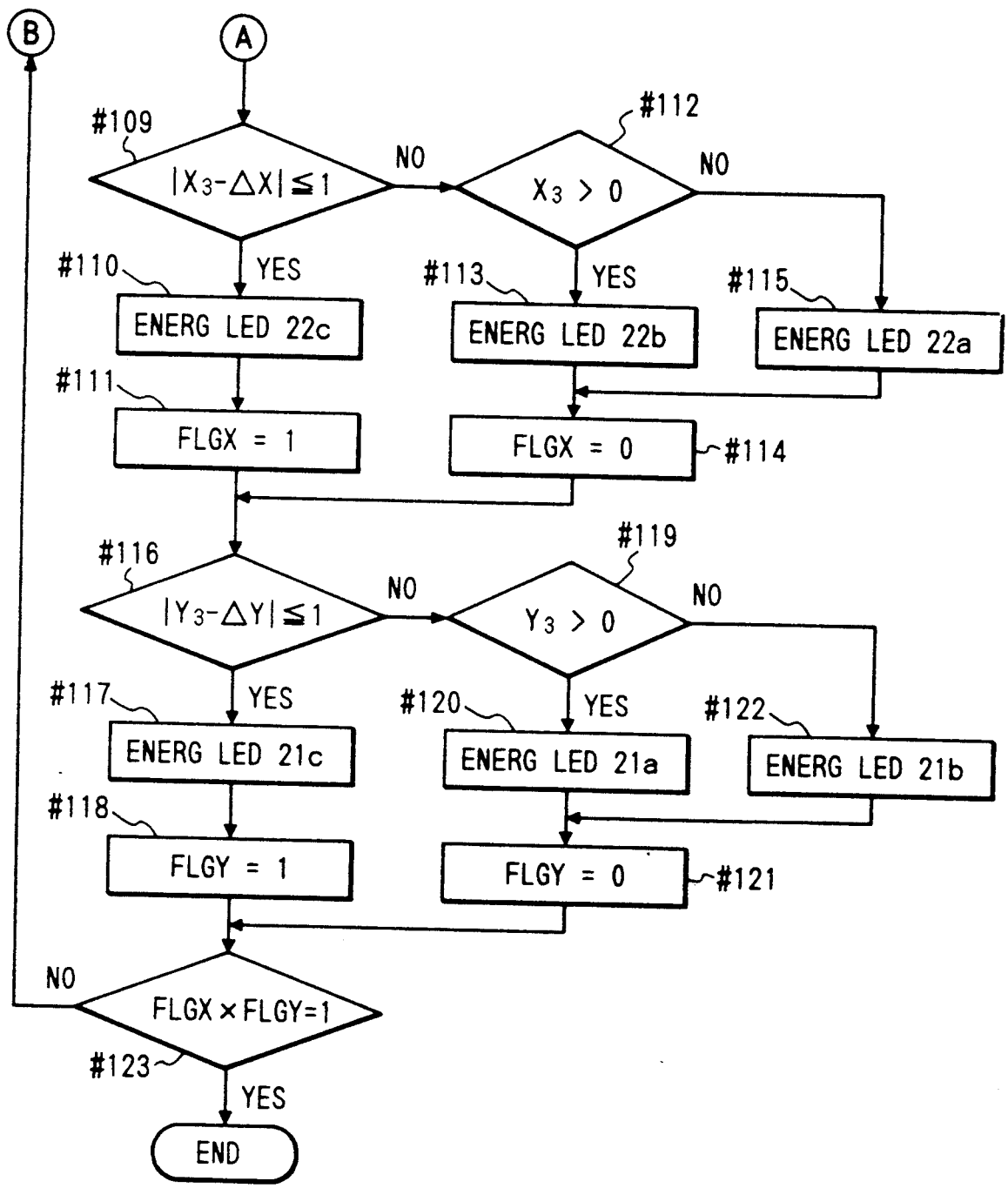

FIG. 4 is the main program. This program is started at the step #101 when an operation button (not shown) is operated with the camera at the ready, for example. Then, at the step #102, the basic composition information recorded on the card C1 is inputted from the information read circuit 3 for the storage. In other words, in the present embodiment wherein the card C1 is assumed to be loaded, the equations given below:

$$X3 = \frac{X1 + X2}{2} \quad (1)$$

$$Y3 = \frac{Y1 + Y2}{2} \quad (2)$$

and $$\Delta X = 0, \Delta Y = 0 \quad (3)$$

are recorded on the card C1 as basic composition information. Based on them, X3 is the intermediate point of the X1 and X2, and Y3 is the intermediate point of the Y1 and Y2. Also, ΔX and ΔY are both zero.

Next, at the step #103, each of the outputs from the above-mentioned object position recognition circuit 2, i.e., the distance information D(n) (where n=1-608), is read, and the mosaic process is executed at the step #104. The detailed description of this mosaic process will be given in accordance with a subroutine program shown in FIG. 5.

First, at the step #202, the minimum distance among each of the distance information is found and its value is stored in the variable Min. Subsequently, at the step #203, the maximum distance among each of the distance information is found and its value is stored in the variable Max. At the step #204, n is made zero (n=0), and at the step #205, the n is advanced by [1] and the process proceeds to the step #206. At the step #206, the judgment |D(n)−Min|≦k1 (where k1 is a constant) is made. If the result is affirmative, the N(n)=1 at the step #207; if negative, the N(n)=0 at the step #208. Then, the process proceeds to the step #209. At the step #209, the judgment |D(n)−Max|≦k2 (where k2 is a constant) is made. If the result is affirmative, the F(n)=1 at the step #210; if negative, the F(n)=0 at the step #211. Then, the process proceeds to the step #212. Subsequently, until when the judgment is made for the n=608 at the step #212, i.e, until when the processes have been executed for the entire distance information at the step #212, the processes from the steps #205 are repeated. Then, the process returns to the main program shown in FIG. 4.

Figure 5:
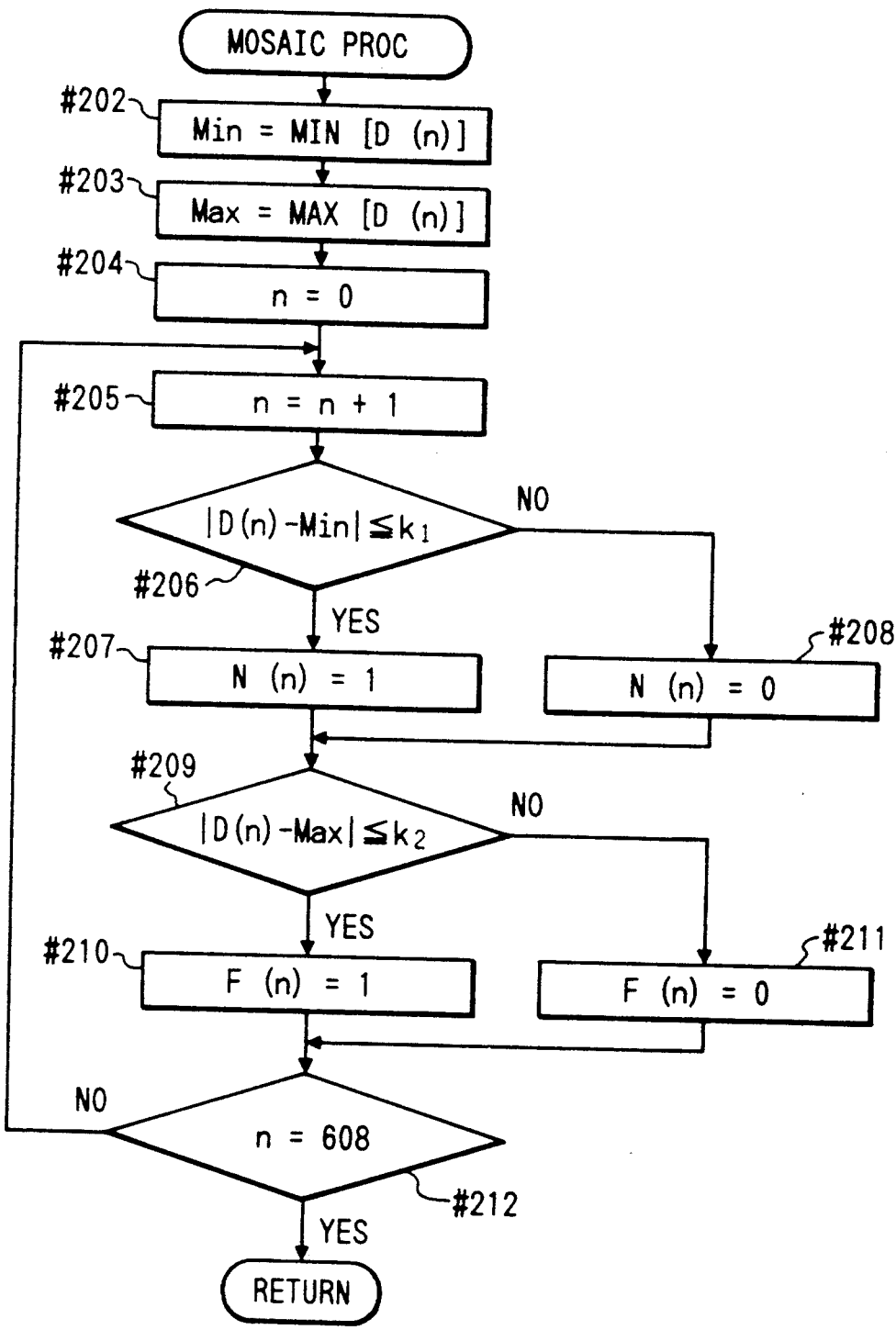

According to this mosaic process shown in FIG. 5, the divided region (FIG. 2) having information closest to the minimum value Min among each of the distance information D(n) and the divided region having information closest to the maximum value Max are selectively extracted respectively. Then, further in accordance with the example shown in FIG. 2, the region 11' shown with the slanting lines is described as the region indicated by n when the N(n)=1 is judged, and this region 11' corresponds to the person 11 in FIG. 3. Also, the region indicated by n, when the F(1)=1 is judged, is the region 12' which corresponds to the tower 12.

Now, at the step #105 shown in FIG. 4, X1 and X2 are obtained respectively on the basis of the regions 11' and 12' extracted as above, and likewise, Y1 and Y2 are obtained at the next step #106. At the step #107, the X1 and X2 thus obtained are assigned to the above-mentioned equation (1) to calculate X3, and at the step #108, the Y1 and Y2 are assigned to the equation (2) to calculate Y3.

Then, the process proceeds to the step #109, and at the step #109 through step #123, the control is performed to indicate a shifting from ($\Delta X$ and $\Delta Y$) (in this case (0, 0) to (X3 and Y3).

In other words, at the step #109, the judgment $|X3-\Delta X| \leq 1$ is made, and if affirmative, the indication that the position of the photographing plane 10 in the left and right directions should be held at the current position is provided by turning on the LED 22c through the display circuit 5 at the step #110 and the same time, the FLGX is set at 1 at the step #111. The process proceeds to the step #116. On the other hand, if the result of the judgment at the step #109 is negative, the X3 is judged at the step #112 and if the result is positive, the LED 22b is turned on at the step #113, and if negative, the LED 22a is turned on at the step #115. Then, subsequent to the step #113 and step #115, the FLGX is set at zero at the step #114, and the process proceeds to the step #116.

At the step #116, the judgment $|Y3-\Delta Y| \leq 1$ is made, and if affirmative, the indication that the position of the photographing plane 10 in the vertical direction should be held at the current position is made by turning on the LED 21c at the step #117 and at the same time, the FLGY is set at 1 at the step #118. Then the process proceeds to the step #123. If the result of the judgment at the step #116 is negative, the Y3 is judged at the step #119, and if positive, the LED 21a is turned on at the step #120; if negative, the LED 21b is turned on at the step #122. Then, subsequent to the step #120 and step #122, the FLGY is set at zero at the step #121, and the process proceeds to the step #123. At the step #123, FLGX×FLGY is examined to see if it is 1 or not, i.e., both the FLGX×FLGY is examined to judge whether both of them are 1 or not. If the result is affirmative, the process is terminated; if negative, the process returns to the step #103. Hence the above processes are repeated. Here, both the FLGX and FLGY are 1, which means that the LED 21c and LED 22c are illuminated.

According to the procedures mentioned above, the direction of the composition which should be shifted (X3, Y3) corresponds to this direction) is calculated on the basis of the outputs from the object position recognition circuit 2 and the basic composition information read from the card C1. Then, the processes (step #109 through step #123) are executed to provide the indications so as to enable the ($\Delta X$, $\Delta Y$) to be approximated to the (X3, Y3). In other words, the indications are provided by the LEDs 21a-21c and 22a-22c to shift the composition toward the directions calculated as above.

In describing this specifically, a state shown in FIG. 3A, for example, represents that the person 11 is positioned in the center of the photographing plane 10, and the space on the left side is unnaturally wide, and that the upper part of the tower 12 is also projected out of the photographing plane 10. This can hardly be a good composition. In such a case, according to the procedures shown in FIG. 4 using the card C1, the shifting direction of the composition is calculated in order to obtain a composition in which the object formed by the person 11 and tower 12 is position in the central part of the photographing plane 10. As the modifying direction of this composition lies on the right side, the LEDs 21a-22b are illuminated as shown in FIG. 3A to indicate that the photographing plane 10, i.e., the composition, should be shifted toward the right upper side. Then, when the photographer shifts the photographing plane 10 toward the right upper side, the LED 21c and 22c are illuminated (in a state shown in FIG. 3B) as the object formed by the person 11 and tower 12 is positioned in the central part of the photographing plane 10 to indicate that the photographing plane 10 should be held at such position. In this state, the arrangement of the person 11 and tower 12 is appropriate and the space on the left side is not too wide, either. Also, the entire body of the tower 12 is in the photographing plane.

Subsequently, when the photographer operates the release button after having confirmed that the LEDs 21c and 22c are illuminated, the exposure circuit 4 drives the diaphragm 6 and shutter 7 to take a picture; hence-obtaining a photograph of an excellent composition as shown in FIG. 3B.

In this respect, the basic composition information recorded on the card C1 is to position the main object (the person) and the background object (the tower) in the central part of the photographing plane as described above, and its contents are expressed by the equations (1) to (3). For the other basic composition information, the equations given below are considered.

$$X3 = \frac{X1 + 2X2}{3} \quad (4)$$

$$Y3 = \frac{Y1 + 2Y2}{3} \quad (5)$$

$$\Delta X = 0, \Delta Y = 0 \quad (6)$$

In this case, the person 11 is slightly shifted toward the center as compared with the basic composition information recorded on the card C1.

Also, in the case of the equations given below.

$$X3 = \frac{X1 + X2}{2} \quad (7)$$

$$Y3 = \frac{Y1 + Y2}{2} \quad (8)$$

$$\Delta X = -3, \Delta Y = -3 \quad (9)$$

the person 11 is positioned at the left lower side of the photographing plane 10.

If these pieces of the basic composition information are recorded on the cards C2 and C3 respectively, it is possible to take a picture in a composition to be desired.

In the embodiment set forth above, the object position recognition circuit 2 constitutes an object position recognition means; the control circuit 1, a computation means; and the display circuit 5 and the LEDs 21a-21c and 22a-22c, an indication means, respectively.

In this respect, besides the basic composition information cards mentioned above, bar codes may be used to input the required information, for example, or either single or plural of them may be stored in the camera in advance. Also, if an interface is provided in the main body of the camera so that the photographer himself may input his own basic composition information produced by the use of a personal computer or electronic note, it is possible to utilize various pieces of basic composition information effectively. Particularly, in the case of using the electronic note, it should be more convenient to make such utilization because both the camera and the electronic note are portable simultaneously.

Further, in the above-mentioned embodiment, while the photographing plane is divided into a plurality of regions to recognize the object position on the basis of the distance information in each of the divided regions, the present invention is not limited thereto. It may also be possible to make such recognition on the basis of the luminous information or chromatic information of an object, for example. It may also be possible to recognize the object position in the photographing plane (distance relationship) in such a manner that a ultrasonic beam is emitted from the main body of the camera to scan the object regions and receive the reflection waves as in the case of a ultrasonic microscope. In this case, it is possible to recognize the positional relationship of the objects more precisely.

Furthermore, it is not limited for obtaining the modifying direction of the composition to calculate the X3 and Y3 from the X1, X2, Y1, and Y2 as described above. The contents of the basic composition information are not limited to the above-mentioned equations, either.

Also, the positions, shapes, numbers, and indication modes, and the like of the LED are not limited to those described above, and it may be possible to make the required indications by any display devices other than the LED. In place of a display device, a voicing device may also be used to make the required indication.

According to the present invention, the object position in the photographing plane is recognized, and on the basis of such result and the basic composition information defined in advance, the direction of the composition which should be modified is calculated. Then, the indication is made to shift the composition toward the direction thus calculated. Therefore, anyone of the photographers can take a picture of an excellent composition by modifying the direction of the composition in accordance with such indication.

What is claimed is:

1. A camera comprising:
   detection means for detecting the position of an object in the photographing plane to output the result thereof as positional information; and
   determination means for determining the optimum composition on the basis of said positional information and a predetermined compositional information.

2. A camera comprising:
   detection means for detecting the position of an object in the photographing plane to output the result thereof as positional information;
   determination means for determining the optimum composition on the basis of said positional information and a predetermined compositional information; and
   indication means for indicating the direction of the photographing plane to be shifted with respect to the object to obtain said determined optimum composition.

3. The camera of claim 2, wherein
said detection means further determines the optimum composition on the basis of the positional relationship between a plurality of objects when said detection means detects plural objects.

4. The camera of claim 2, wherein
said detection means is TTL phase difference detector.

5. The camera of claim 2 further comprising:
input means for inputting a compositional information into said determination means.

6. The camera of claim 5, wherein
said input means is a recording means with the compositional information recorded therein.

7. The camera of claim 2, wherein
said indication means is LED installed in the finder.

8. The camera of claim 2, wherein
said indication means represents the shifting direction of the composition in two, the longitudinal direction and transversal direction of the camera.

9. The camera of claim 2, wherein
means indicates a hold at the current position when no compositional shifting is required.

10. The camera of claim 6, wherein
said recording means is a card.

11. The camera of claim 2, wherein
said detection means detects information regarding the photographing distance.

12. The camera of claim 11, wherein
said detection means extracts the maximum photographing distance and information in the vicinity thereof.

13. The camera of claim 11, wherein
said detection means extracts the minimum photographing distance and information in the vicinity thereof.

14. The camera of claim 2, wherein
said compositional information is concerned with the central position of a composition.

15. The camera of claim 2, wherein
said compositional information is concerned with the deviation of the central position of a composition.

16. A camera comprising:
detecting means for detecting position of objects in a scene to be photographed;
determining means for determining a direction in which composition of the scene should be changed, on the basis of an output of the detecting means; and
indicating means for indicating said direction on the basis of an output of the determining means.

* * * * *